United States Patent
Gottschalk

[11] 3,828,888
[45] Aug. 13, 1974

[54] PLASTIC FOAM BELL FOR A BABY CARRIAGE

[75] Inventor: Charlotte H. Gottschalk, Aldergrove, B.C., Canada

[73] Assignee: The Raymond Lee Organization Inc., New York, N.Y. ; a part interest

[22] Filed: Aug. 15, 1973

[21] Appl. No.: 388,605

[52] U.S. Cl. ........ 181/33 R, 181/33 GC, 181/33 K, 280/47.38
[51] Int. Cl. ............................................. E04b 1/84
[58] Field of Search ............ 181/33 R, 33 C, 33 GB, 181/33 GC, 33 K; 280/47.38; 296/1 B; 5/93 R, 101, 317 R, 329, 330, 1

[56] References Cited
UNITED STATES PATENTS
338,798  3/1886  Spencer .......................... 280/47.38
3,780,825  12/1973  Rinaldi ..................... 181/33 GC X FOREIGN PATENTS OR APPLICATIONS
1,459,167  10/1966  France .............................. 181/33 K
1,466,371  12/1966  France .......................... 181/33 GC Primary Examiner—Richard B. Wilkinson
Assistant Examiner—John F. Gonzales
Attorney, Agent, or Firm—Howard I. Podell

[57] ABSTRACT

A bell-shaped plastic foam device with miniature bells which is attached to a flexible rod connected to the side of a baby carriage for hanging over the carriage. This device simultaneously amuses the baby while muffling the noise of a crying baby.

3 Claims, 5 Drawing Figures

PATENTED AUG 13 1974    3,828,888

PLASTIC FOAM BELL FOR A BABY CARRIAGE

SUMMARY OF THE INVENTION

My invention is a bell-shaped plastic foam device adaptable for fastening to a baby carriage. The plastic foam bell is attached to a flexible rod which has a clamp on one end for fastening to the carriage side.

An advantage of my invention is that it muffles the sound of a crying baby, while at the same time acting to amuse the child.

A further advantage of my invention is that it serves as a protective shield, to a baby in the carriage, against the rain, dust, wind and sun.

A still further advantage of my invention is that it can be removed from the carriage and attached to the crib or playpen for the baby's amusement as well as for decoration in the nursery.

Metal bells may be fastened inside the plastic enclosure to provide further entertainment for a child in the carriage to which the device is clamped.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
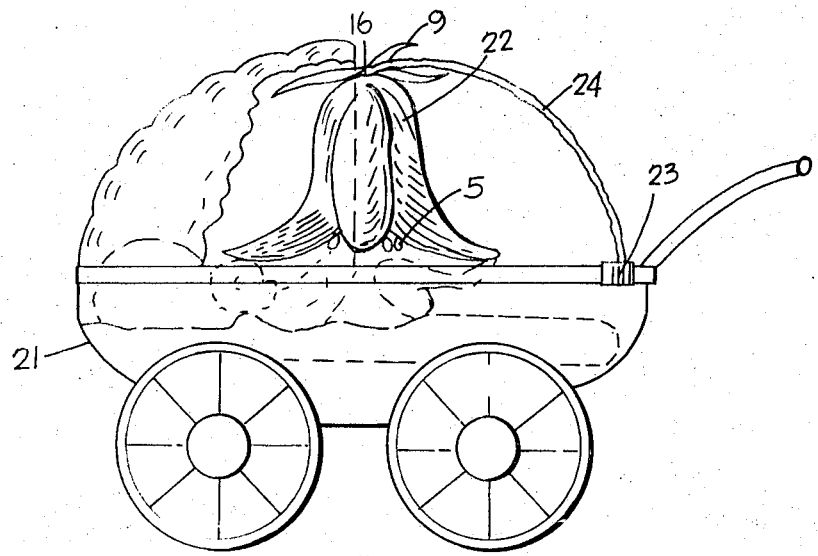
FIG. 1 is a side view of the baby carriage and the attached plastic foam bell.

Turning now descriptively to the drawings, in which similar reference characters denote similar elements throughout the several views, FIG. 1 illustrates the plastic foam shaped bell 22 attached to the baby carriage 21 by means of clamp 23 which holds the flexible rod 24 to which the bell 22 is joined. The plastic foam shaped bell 22 is connected to the ball hinge 16 which is joined to rod 24. The plastic foam shaped bell 22 incorporates three metal bells 25 which hang on strings 26 from the decorated underside 28 of the bell 22.

Figure 2:
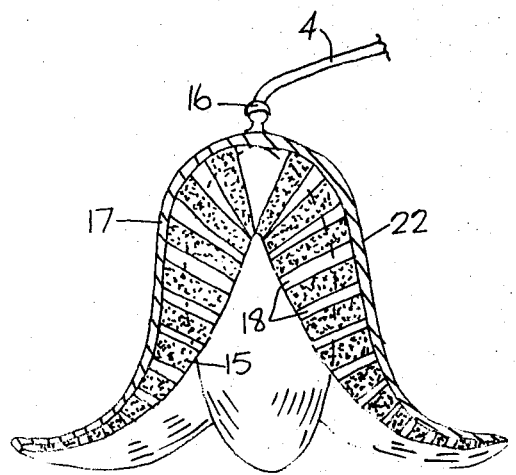
FIG. 2 is a cross-sectional view of the plastic foam shaped bell.

FIG. 2 illustrates the flexible rod 24 terminating at one end in hinge 16. Bell 22 is formed with an outer hard skin 17 of plastic composition with the inner material 15 of the bell 22 being formed of plastic foam material containing holes 18 absorbing sound.

Figure 3:
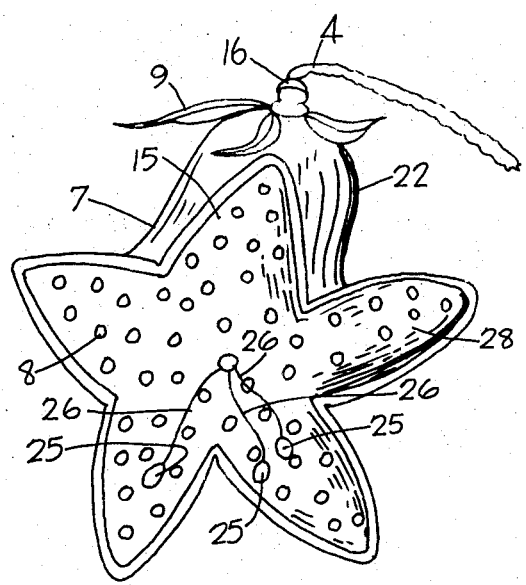
FIG. 3 is a bottom perspective view of the plastic foam shaped bell.

FIG. 3 illustrates the fastening of small metal bells 25 by strings 26 to the underside 28 of bell 22.

Figure 4:
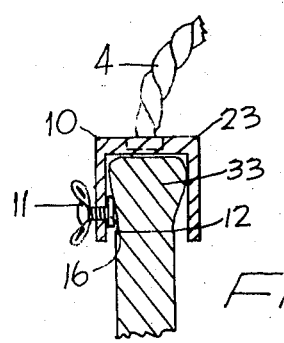
FIG. 4 is a fragmentary side sectional view of the clamp for attachment to the baby carriage.

FIG. 4 illustrates the clamp 23 of inverted U-shape attached to the edge 33 of the baby carriage 21. The thumb screw type cleat 26 of the clamp 3 is tightened against the side edge 33 of the baby carriage.

Figure 5:
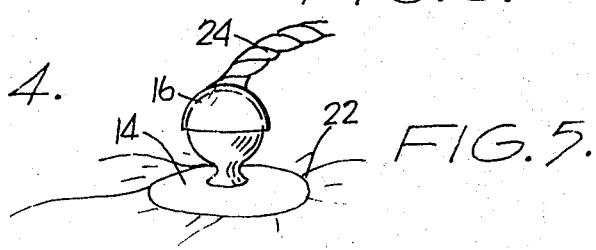
FIG. 5 is a perspective view of the hinge mounting of the plastic foam shaped bell.

FIG. 5 illustrates the flexible rod 24 by ball joint 16 to a bracket 14 fastened to the top of bell 22.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by letters Patent of the United States is:

1. A device for attachment to the side of a baby carriage for mounting above the top of the baby carriage so as to provide both a protective shield to a baby in the carriage and to provide sound muffling qualities comprising a shield in the form of a bell composed of plastic foam material with a hard outer plastic skin which is mounted to a flexible rod, the flexible rod being fitted on its free end with a clamp adaptable for attaching to the upper side edge of a baby carriage.

2. The combination as recited in claim 1 in which the plastic foam interior of the bell is fitted with holes extending from the central section of the bell to the outer skin so as to provide sound traps.

3. The combination as recited in claim 1 in which decorative bells are fastened by strings to the interior section of the bell-shaped object.

* * * * *